(12) United States Patent
Murakami et al.

(10) Patent No.: US 8,496,282 B2
(45) Date of Patent: Jul. 30, 2013

(54) DOOR FOR CABIN IN CONSTRUCTION MACHINE

(75) Inventors: Yoshiaki Murakami, Hiroshima (JP); Masafumi Yoneda, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 194 days.

(21) Appl. No.: 13/168,092

(22) Filed: Jun. 24, 2011

(65) Prior Publication Data

US 2012/0001454 A1    Jan. 5, 2012

(30) Foreign Application Priority Data

Jul. 1, 2010    (JP) .................................. 2010-150967

(51) Int. Cl.
*B60J 7/00* (2006.01)
(52) U.S. Cl.
USPC ...................................................... 296/65.05
(58) Field of Classification Search
USPC ................. 296/190.1, 146.9, 187.12, 190.11; 244/118.5, 129.5, 129.4, 137.2; 292/336.3, 292/216; 114/117, 230; 280/728.3
See application file for complete search history.

(56) References Cited

U.S. PATENT DOCUMENTS

| | | | | |
|---|---|---|---|---|
| 3,982,601 A | * | 9/1976 | Williams | 180/89.12 |
| 4,035,016 A | * | 7/1977 | Ricca | 296/190.11 |
| 4,050,735 A | * | 9/1977 | Molnar | 296/102 |
| 4,082,343 A | * | 4/1978 | Hurt et al. | 296/190.03 |
| 4,135,757 A | * | 1/1979 | Smith et al. | 296/35.1 |
| 4,221,274 A | * | 9/1980 | Martin, Jr. | 180/69.2 |
| 4,392,669 A | * | 7/1983 | Martin, Jr. | 280/775 |
| 4,772,065 A | * | 9/1988 | Nakata et al. | 264/279 |
| 4,957,324 A | | 9/1990 | Doescher et al. | |
| 5,002,332 A | * | 3/1991 | Ikeda | 296/190.11 |
| 5,273,340 A | * | 12/1993 | Nelson et al. | 296/190.08 |
| 5,286,081 A | * | 2/1994 | Martin, Jr. | 296/190.08 |

(Continued)

FOREIGN PATENT DOCUMENTS

| | | |
|---|---|---|
| EP | 1 081 294 A1 | 3/2001 |
| JP | 7-33721 U | 6/1995 |

(Continued)

OTHER PUBLICATIONS

Japanese Office Action Issued May 8, 2012 in Patent Application No. 2010-150967 (with English translation).

(Continued)

*Primary Examiner* — Kiran B Patel
(74) *Attorney, Agent, or Firm* — Oblon, Spivak, McClelland, Maier & Neustadt, L.L.P.

(57) ABSTRACT

A cabin in a construction machine has a door having a vertically extending door frame and a door glass attached to the door frame. The door frame has a pulling handle portion which is attached to the cabin frame pivotally around a vertical pivot axis and projects in a direction having a component extending away from the door glass. The pulling handle portion is aligned with the riding handle in front and rear directions outside the cabin when the door is fully opened. The pulling handle portion satisfies at least one of a first condition that the height position of the second gripped portion is offset upward from the height position of the riding handle, and a second condition that the second gripped portion of the pulling handle portion extends in a second extending direction different from the first extending direction.

3 Claims, 6 Drawing Sheets

U.S. PATENT DOCUMENTS

| | | | |
|---|---|---|---|
| D348,553 S * | 7/1994 | Martin, Jr. | D34/37 |
| 5,413,188 A * | 5/1995 | Ui | 180/89.12 |
| 5,564,774 A * | 10/1996 | Shinsen | 296/190.11 |
| 5,577,795 A * | 11/1996 | Shinsen | 296/190.11 |
| D398,616 S * | 9/1998 | Kwak et al. | D15/30 |
| 6,065,799 A * | 5/2000 | Suwabe et al. | 296/190.04 |
| D427,612 S * | 7/2000 | Shim | D15/23 |
| 6,149,228 A * | 11/2000 | O'Neill et al. | 296/190.03 |
| 6,155,632 A * | 12/2000 | Fujimoto | 296/190.08 |
| 6,325,449 B1 * | 12/2001 | Sorensen et al. | 296/190.08 |
| 6,336,293 B1 * | 1/2002 | Kamimura | 49/171 |
| 6,430,852 B2 * | 8/2002 | Murakami | 37/466 |
| 6,502,896 B1 * | 1/2003 | Nakata et al. | 296/190.05 |
| D481,044 S * | 10/2003 | Tokach et al. | D15/30 |
| 6,669,272 B2 * | 12/2003 | Ayabe et al. | 296/190.08 |
| 7,360,823 B2 * | 4/2008 | Nakayama et al. | 296/190.11 |
| 7,360,824 B2 * | 4/2008 | Nakayama et al. | 296/190.11 |
| 7,413,241 B2 * | 8/2008 | Murakami et al. | 296/190.08 |
| D577,040 S * | 9/2008 | Kim | D15/30 |
| 7,438,349 B2 * | 10/2008 | Jo et al. | 296/190.11 |
| 7,575,272 B2 * | 8/2009 | Ishii et al. | 296/190.04 |
| 7,699,328 B2 * | 4/2010 | Crawford | 280/166 |
| 7,896,290 B2 * | 3/2011 | Saku et al. | 244/129.5 |
| 7,934,767 B2 * | 5/2011 | Kim et al. | 296/190.11 |
| 7,992,925 B2 * | 8/2011 | Lagrut | 296/187.09 |
| 8,016,345 B1 * | 9/2011 | Goddard et al. | 296/190.01 |
| 8,152,226 B2 * | 4/2012 | Iwakata et al. | 296/190.1 |
| 2002/0149232 A1 * | 10/2002 | Sakyo et al. | 296/190.08 |
| 2005/0082433 A1 * | 4/2005 | Saku et al. | 244/129.5 |
| 2007/0046071 A1 * | 3/2007 | Steiger et al. | 296/193.01 |

FOREIGN PATENT DOCUMENTS

| | | |
|---|---|---|
| JP | 8-260518 A | 10/1996 |
| JP | 2000-96624 A | 4/2000 |
| JP | 2000-234353 A | 8/2000 |
| JP | 2009-215702 | 9/2009 |

OTHER PUBLICATIONS

Extended European Search Report issued on Oct. 10, 2011 in the corresponding European Application No. 11172092.6.

* cited by examiner

DOOR FOR CABIN IN CONSTRUCTION MACHINE

BACKGROUND OF THE INVENTION

1. Field of the Invention

The present invention relates to a door of a cabin having an entrance and provided in a construction machine such as a hydraulic shovel, the door adapted to open and close the entrance.

2. Description of the Background Art

FIG. 6 shows an example of a hydraulic shovel provided with a cabin 7 having a door, and FIGS. 7 through 9 show the cabin 7 with the door opened.

The hydraulic shovel is provided with a crawler-type lower propelling body 1, an upper slewing body 2 loaded on the lower propelling body 1 slewably around an axis perpendicular to the ground, and a working attachment 6 to be attached to the upper slewing body 2. The working attachment 6 has a boom 3, an arm 4 and a bucket 5. The cabin 7 is disposed on a left-side front portion of the upper slewing body 2.

In the present specification, "front and rear" and "left and right" are described based on a viewing direction of an operator seated in the cabin 7.

The cabin 7 has a cabin frame, an entrance 8 formed in the cabin frame to allow the operator to get in and out of the cabin through the entrance 8, and a door 9. The entrance 8 is formed in a front portion on a left surface of the cabin 7. The door 9, which is adapted to open and close the entrance 8, has a front end portion to be pivotally connected to a main body of the cabin 7 and a rear end portion so as to open and close the entrance 8.

The cabin frame has a front fringe portion located on the front side of the entrance 8 and a rear fringe portion located on the rear side of the entrance 8, the front and rear fringe portions attached with front and rear riding handles 10 and 11 respectively. Each of the front and rear riding handles 10 and 11, which is provided at an intermediate position of the cabin frame in respect of up and down directions, has a pair of upper and downward extending portions projecting from the corresponding fringe portion and a connecting portion vertically interconnecting respective ends of the projections, thus allowing the operator to get in and out of the cabin by gripping vertical portions of the front and rear riding handles 10 and 11.

The door 9, as also shown in FIG. 9, has a door frame 12 formed of a vertically extending pipe and a door glass 13 to be attached to the door frame 12. The cabin frame includes an intermediate pillar 14 located at an intermediate portion of the cabin frame in respect of front and rear directions. The door frame 12 has an upper end and a lower end to be attached to the intermediate pillar 14 via a pair of upper and lower hinges 15 and 15 pivotally around a vertical axis respectively. The door glass 13 pivots integrally with the door frame 12 to thereby open and close the entrance 8.

The pipe constituting the door frame 12 has been bent to form the door frame 12 into a shape having an upper straight portion and a lower straight portion each vertically extending and an intermediate portion located between the upper and lower straight portions and bulging from the upper and lower straight portions orthogonally to vertical directions. As shown in FIG. 9, a small clearance C2 is formed between the upper and lower straight portions and the door glass 13; and a clearance C1 is formed between the intermediate portion and the door glass 13. The clearance C1 has a size larger than that of the clearance C2 and large enough to allow the operator to insert his fingers into the clearance C1 to grip the intermediate portion. The intermediate portion of the door frame 12, therefore, serves as a pulling handle portion 16 to be gripped by the operator to close the door 9 by a pulling operation from the inside of the cabin 7.

Although not illustrated, the cabin 7 is provided with, in addition to the pulling handle portion 16, an opening/closing handle to be operated in a direction of opening the door 9 from the inside of the cabin 7 and operated to open and close the door 9 on the outside of the cabin 7, and a catch mechanism for retaining the door 9 at both of the opening position and the closing position.

There has been found no document disclosing a door provided with the door frame 12 constituted of a pipe as described above. The technology relating to the above arrangement is disclosed in Japanese Unexamined Patent Publication No. 2009-215702.

The door 9 has a drawback that the operator may misuse the pulling handle portion 16 as the riding handle to thereby allow an unwanted mechanical load to be applied on the door frame 12 or on the door glass 13. Specifically, the pulling handle portion 16 is:

a) positioned at such a height position that the operator standing on the ground is likely to grip, as well as the intermediate portion of the rear riding handle 11;

b) positioned immediately behind the rear riding handle 11, and c) provided with a vertically extending portion which is likely to be gripped by the operator, as well as the rear riding handle 11.

Furthermore, the pulling handle portion 16 is vertically longer than the rear riding handle 11 and has a shape of projecting outwardly when the door glass 13 is opened; this is intend to cause the operator to mistakenly grip the pulling handle portion 16 when getting in and out of the cabin.

SUMMARY OF THE INVENTION

An object of the invention is to provide a door for a cabin in a construction machine, which door includes a pulling handle portion to be pulled in a direction of closing the door from the inside of the cabin and is capable of preventing the pulling handle portion from being used as a riding handle by mistake.

The door according to the invention is provided in a cabin including a cabin frame having an entrance and a riding handle projecting, in a specific direction, from a fringe portion fringing the entrance of the cabin frame, the riding handle including a first gripped portion extending in a first extending direction to be gripped by an operator when the operator rides in the cabin. The door comprises a door frame vertically extending and a door glass to be attached to the door frame. The door frame is attached to the cabin frame pivotally around a vertical pivot axis to allow the door to open and close the entrance of the cabin. The door frame has a pulling handle portion projecting in a direction having a component of a direction away from the door glass to be gripped for operating the door in a closing direction from the inside of the cabin. The pulling handle portion is disposed so as to be aligned with the riding handle in front and rear directions outside the cabin when the door is fully opened. The pulling handle portion has a second gripped portion to be gripped by the hand of the operator. Furthermore, the pulling handle portion satisfies at least one of the following directions: a first condition that the height position of the second gripped portion is offset upward from the height position of the riding handle; and a second condition that the second gripped portion of the pulling handle portion extends in a second extending direction different from the first extending direction.

These and other objects, features and advantages of the present invention will become more apparent upon reading the following detailed description along with the accompanying drawings.

DESCRIPTION OF THE PREFERRED EMBODIMENTS

Figure 1:
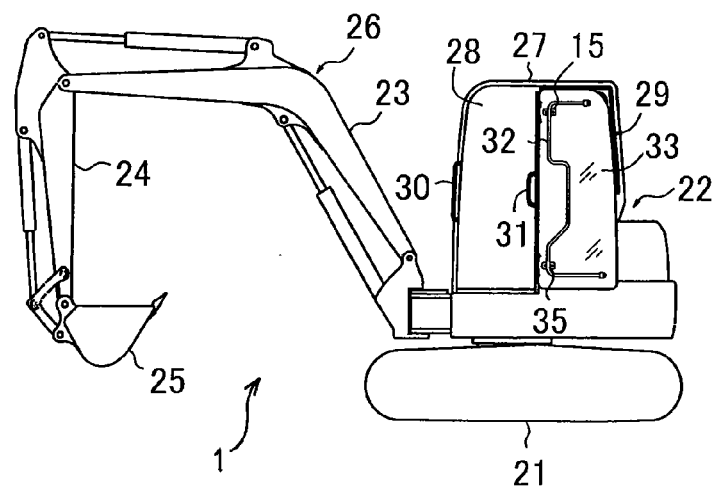
FIG. 1 is a side view of a hydraulic shovel provided with a cabin having a door in accordance with an embodiment of the invention.

An embodiment of the invention is described referring to FIGS. 1 to 5. The embodiment is an example, wherein the invention is applied to a door 29 of a cabin provided in a hydraulic shovel (construction machine 1) shown in FIG. 1.

The hydraulic shovel is provided with a crawler-type lower propelling body 21, an upper slewing body 22 to be loaded on the lower propelling body 21 so as to be slewed around an axis extending perpendicularly to the ground, and a working attachment 26 to be attached to the upper slewing body 22. The working attachment 26 has a boom 23, an arm 24 and a bucket 25. The cabin is disposed on a left-side front portion of the upper slewing body 22.

The cabin has a cabin frame 27, an entrance 28 formed in the cabin frame to allow the operator to get in and out of the cabin through the entrance 28, and a door 29. The entrance 28 is formed in a front portion on a left surface of the cabin. The door 29, which is adapted to open and close the entrance 28, has a front end portion to be pivotally connected to a main body of the cabin and a rear portion adapted to be swung so as to open and close the entrance 28 when the door 29 is pivoted.

The cabin frame 27 has a front fringe portion 27a located on the front side of the entrance 28 and a rear fringe portion 27b located on the rear side of the entrance 28. The front and rear fringe portions are provided with front and rear riding handles 30 and 31 respectively. Each of the front and rear riding handles 30 and 31 is provided at a vertically intermediate position of the cabin frame, having a pair of upper and lower projections each projecting from the corresponding fringe portion (in the riding handle 31, projecting toward the entrance 28, that is, toward the left side in FIG. 2) and a connecting portion vertically interconnecting respective ends of the upper and downward extending portions. The operator is allowed to get in and out of the cabin while gripping the connecting portion of the front and rear riding handles 30 and 31 (that is, a first gripped portion; hereinafter, each may be called "a gripped portion of the riding handle").

Figure 2:
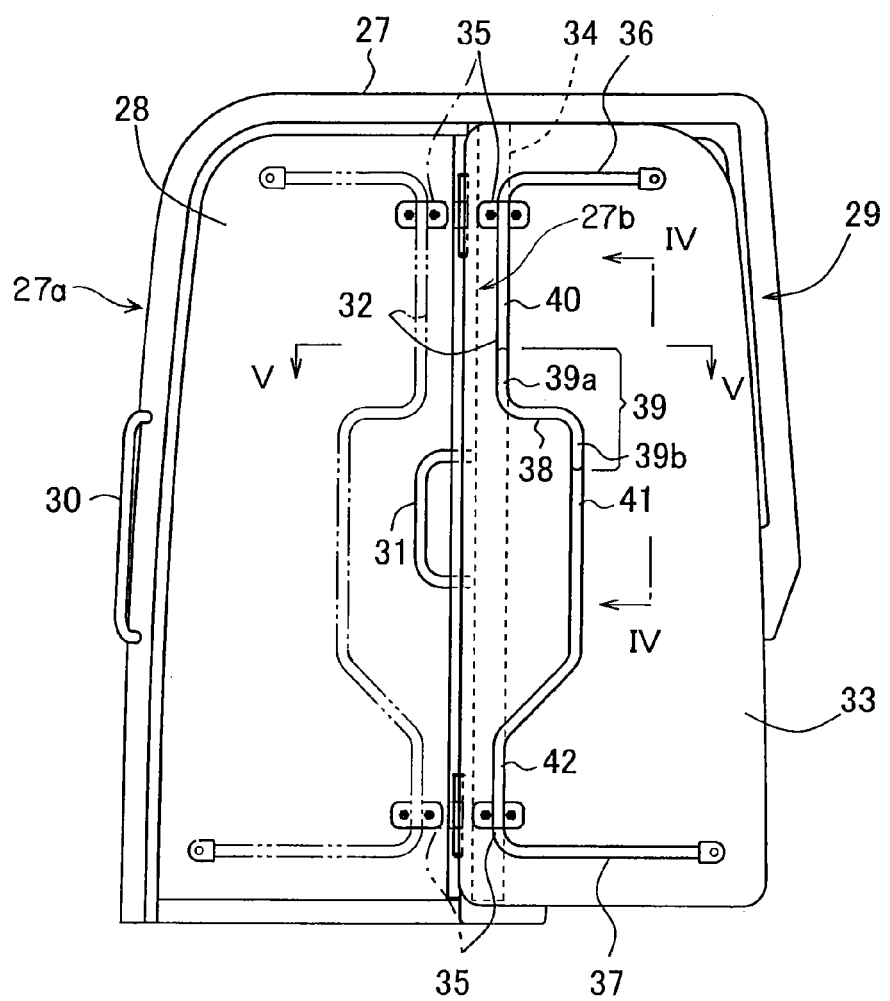
FIG. 2 is an enlarged side view of the cabin.

As also shown in FIG. 2, the door 9 has a door frame 32 formed of a pipe extending vertically and a door glass 33 to be attached to the door frame 32 so as to be positioned outside the door frame 32 when the door 9 is closed. The cabin frame includes an intermediate pillar 34 located at an intermediate portion of the cabin frame in respect of front and rear directions. The intermediate pillar 34 forms the rear fringe portion of the entrance 28. The door frame 32 has an upper end and a lower end to be attached to the intermediate pillar 34 via a pair of upper and lower hinges 35 and 35 pivotally around a vertical pivot axis 35a, respectively. The door glass 33 pivots integrally with the door frame 32 to thereby open and close the entrance 28.

Figure 3:
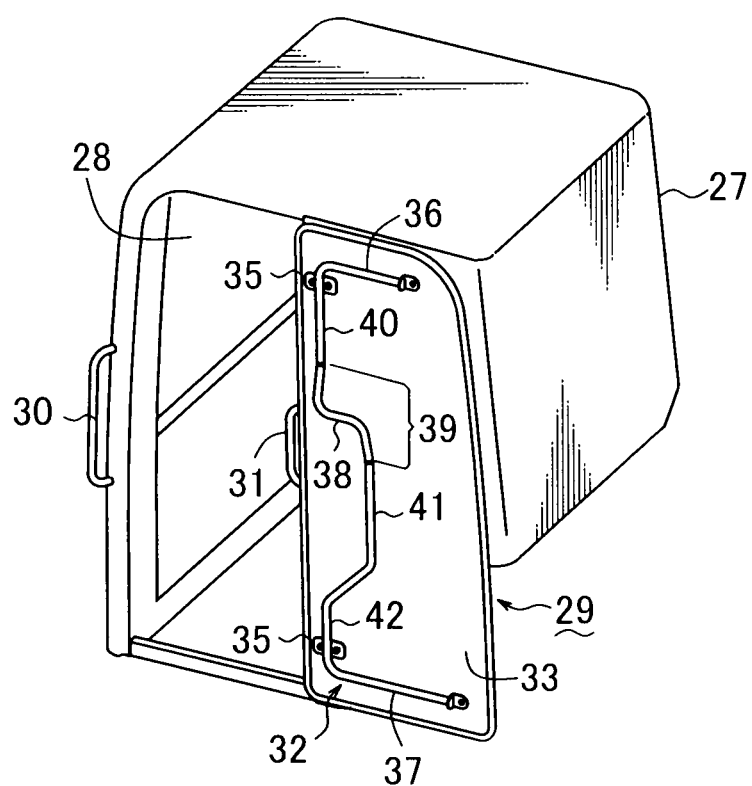
FIG. 3 is a perspective view of the cabin.

The pipe constituting the door frame 32 is bent to thereby bring the door frame 32 into the shape shown in FIG. 2. Specifically, the door frame 32 comprises: an upper front-to-rear extending portion 36 and a lower front-to-rear extending portion 37 that extend in front and rear directions in a state (hereinafter, called as "a door fully-opened state) that the door 29 is fully opened to a position along a wall, at the rear side of the entrance 28, of the cabin frame as shown in FIG. 2 and FIG. 3; an upper vertically extending portion 40 that extends vertically downward from an end, at the front side in a door fully opened state, of both ends of the upper front-to-rear extending portion 36; a lower vertically extending portion 42 that extends vertically upward from an end, at the rear side in a door fully-opened state, of both ends of the lower front-to-rear extending portion 37; a pulling handle portion 39 that is a crank-shaped portion continuous with a lower end of the upper vertically extending portion 40; and a joint portion 41 extending from the pulling handle portion 39 to an upper end of the lower vertically extending portion 42, the upper and lower vertically extending portions 40 and 42 being attached to the intermediate pillar 34 via the hinges 35 and 35 respectively. Furthermore, the door glass 33 is connected to the door frame 32 at four sites, i.e., at respective distal ends of the upper and lower front-to-rear extending portions 36 and 37 and at the upper and lower hinges 35 and 35.

The pulling handle portion 39 includes a laterally extending portion 38. The extending portion 38, which is provided at a position slightly above the intermediate position of the door frame 32 in respect of up and down directions and offset rearward and upward from the rear riding handle 31 in a door fully-opened state, extends laterally from a lower end of the upper vertically extending portion 40, more specifically, extends rearward horizontally (may generally horizontally extend with slight upward or downward inclination rearwardly) in the door opened state. The laterally extending portion 38 constitutes the crank-shaped portion in cooperation with an upward extending portion 39a continuous with the crank-shaped portion at the upper side thereof and a downward extending portion 39b continuous with the crank-shaped portion at the lower side thereof, the crank-shaped portion functioning as the pulling handle portion 39. In other words, the pulling handle portion 39 includes the laterally extending portion 38, the upward extending portion 39a and the downward extending portion 39b; the upward extending portion 39a extends upward from a front end, that is, an end at the front side in the door opened state, of both ends of the laterally extending portion 38, while the downward extending portion 39b extends downward from a rear end, that is, an end at the rear side in the door opened state, of the both ends of the laterally extending portion 38. The laterally extending portion 38 is offset upward from an upper end of the rear riding handle 31.

The upper and lower vertically extending portions 40 and 42, each of which extends along the pivot axis, constitute an upper supported portion and a lower supported portion to be supported by the intermediate pillar 34, which is a rear fringe portion fringing the entrance 28, via the hinges 35 and 35, pivotally about the pivot axis. The front-to-rear extending portions 36 and 37 extend rearward from an upper end of the upper supported portion and a lower end of the lower supported portion in the door opened state respectively, and have respective distal ends connected to the door glass 33, thereby constituting an upper reinforcing portion and a lower reinforcing portion for reinforcing the door glass 33, respectively. The invention permits at least one of the upper and lower reinforcing portions to be omitted as appropriate.

Figure 5:
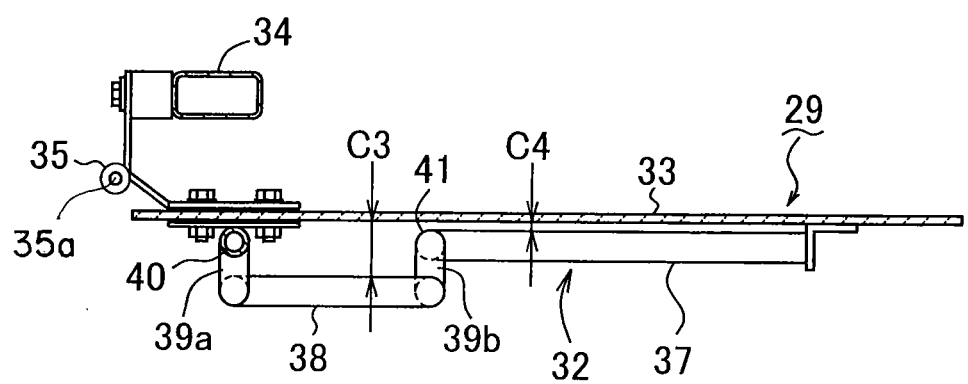
FIG. 5 is an enlarged sectional view taken along the line V-V in FIG. 2.
Figure 6:
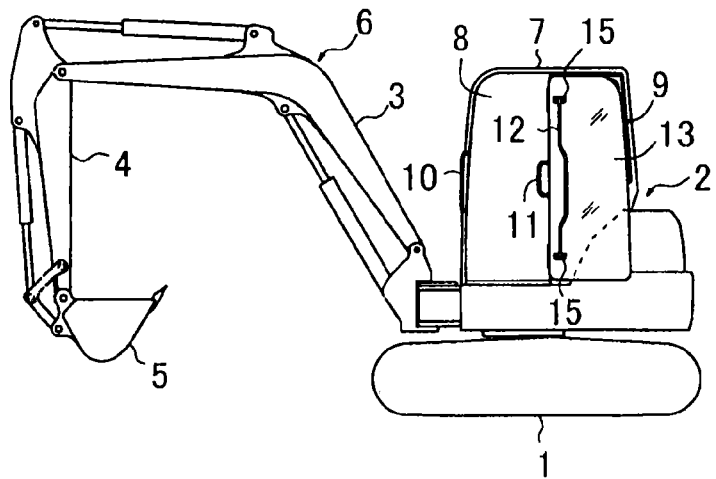
FIG. 6 is a side view showing an example of a hydraulic shovel provided with a cabin having a door.

As shown in FIG. 5, there is secured only a small clearance C4 (see FIG. 2): a) between the door glass 33 and each of the upper and lower vertically extending portions 40 and 42 that are the upper and lower supported portions; and b) between the door glass 33 and each of the upper and lower front-to-rear extending portions 36 and 37 that are the respective upper and lower reinforcing portions.

Figure 4:
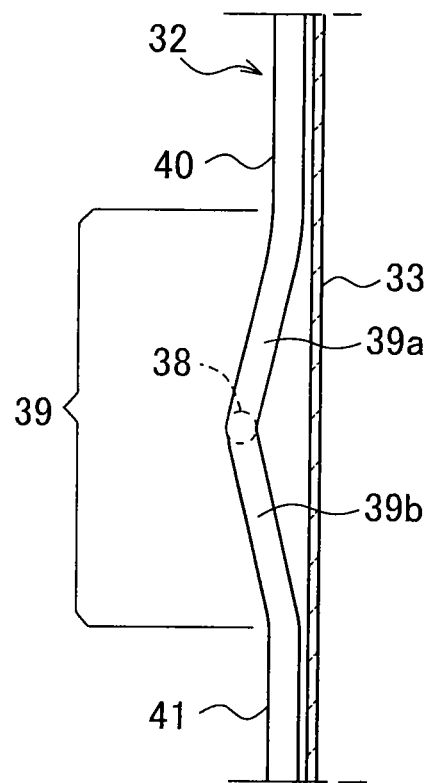
FIG. 4 is an enlarged sectional view taken along the line IV-IV in FIG. 2

In contrast, the upper extending portion 39a of the portions constituting the pulling handle portion 39, as shown in FIG. 4 and FIG. 5, projects from the door glass 33 so as to be gradually inclined in such a direction that the pulling handle portion 39a goes away from the door glass 33 as extending downward. The laterally extending portion 38 extends laterally from the upper extending portion 39a in parallel to the door glass 33, while retaining a clearance C3 (see FIG. 5), between the door glass 33 and the upper extending portion 39a, the clearance C3 having a size larger than the size of the clearance C4 and large enough to allow an operator to grip the laterally extending portion 38 by his hand. Besides, the downward extending portion 39b projects from the door glass 33 so as to be gradually inclined in such a direction that the downward extending portion 39b is close to the door glass 33 as extending downward from the rear end of the laterally extending portion 38.

Figure 7:
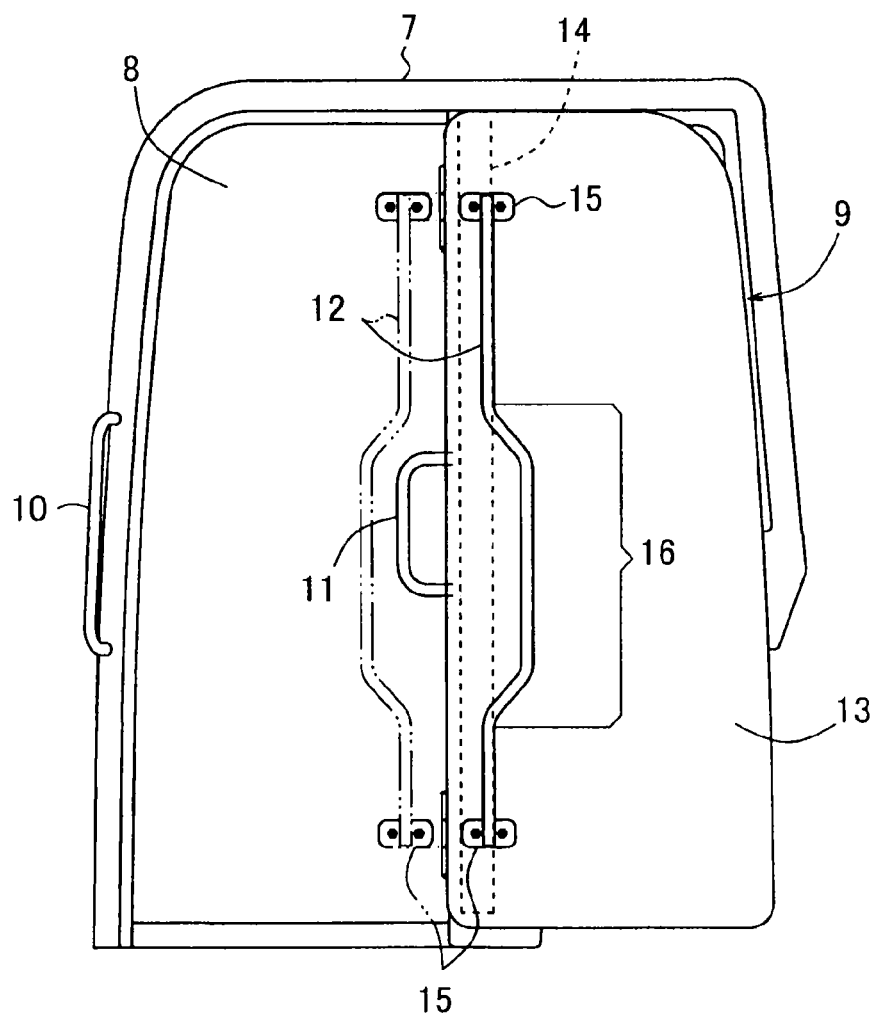
FIG. 7 is an enlarged side view of the cabin shown in FIG. 6.
Figure 8:
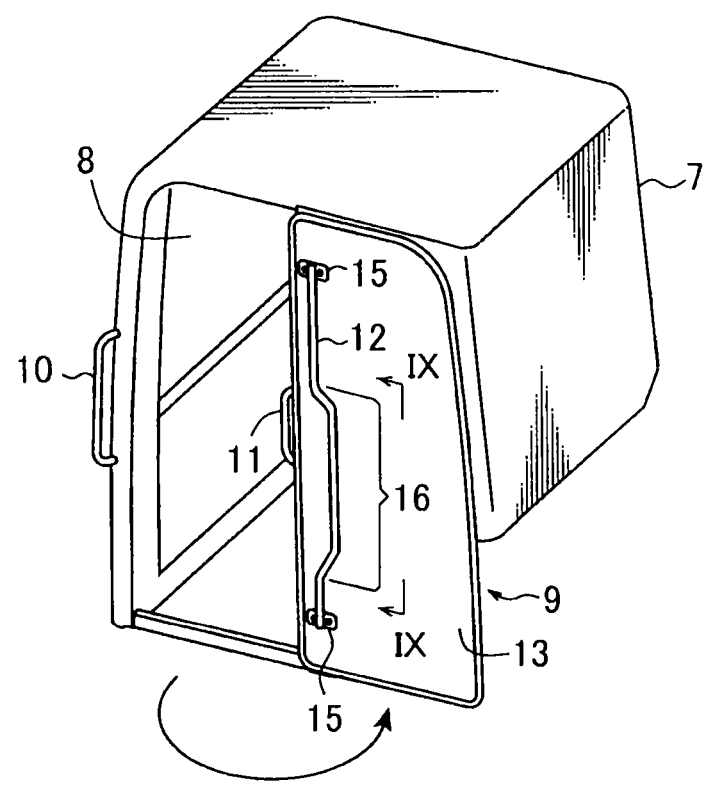
FIG. 8 is a perspective view of the cabin shown in FIG. 6.
Figure 9:
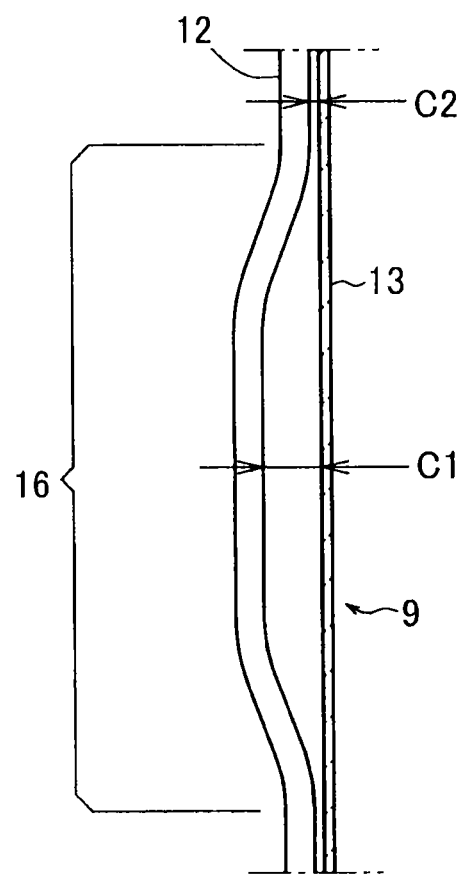
FIG. 9 is an enlarged sectional view taken along the line IX-IX in FIG. 8.

The length of the laterally extending portion 38 can be set to an arbitrary value. Preferably, the length of the laterally extending portion 38 may be set to such a value that the operator can grip the laterally extending portion 38 with ease. For instance, it is preferable to give the laterally extending portion 38 a length size larger than the horizontal size of upper and lower end portions of the pulling handle portion 16 shown in FIG. 7.

In the pulling handle portion 39, therefore, the laterally extending portion 38 serves as a substantial handle portion (hereinafter, called as "a gripped portion of the pulling handle portion") which an operator can actually grip by his hand without difficulty so as to insert his fingers into a space between the laterally extending portion 38 and the door glass 33.

The shape of the joint portion 41 has only to be a shape capable of interjoining the pulling handle portion 39 and an upper end of the lower vertically extending portion 42. The joint portion 41 according to this embodiment has a first portion extending vertically downward from the downward extending portion 39b and a second portion extending from the first portion to the lower vertically extending portion 42 while being inclined in such a direction that the second position is forwardly displaced as extending downward.

The position and the shape of the pulling handle portion 39 enables the pulling handle portion 39 to be prevented from being misused as the riding handle 31 disposed adjacent thereto, in other words, can prevent an operator from gripping the pulling handle portion 39 by mistake when he gets in and goes out of the cabin through the entrance 28. This is because the gripped portion of the pulling handle portion 39 (in this embodiment, that is the laterally extending portion 38) satisfies: the first condition that the height position of the laterally extending portion 38 is offset upward from the height position of the riding handle 31; and the second condition that the extending direction in which the laterally extending portion 38 extends (in this embodiment, that is a lateral direction; a second extending direction according to the invention) is different from the extending direction of a gripped portion of the riding handle 31 to be gripped by an operator (in this embodiment, that is a vertical direction; a first extending direction according to the invention).

Specifically, the laterally extending portion 38, satisfying the first condition, clarifies the difference in function between the pulling handle portion 39 and the riding handle 31, and further makes an operator fall into a difficulty in gripping the pulling handle portion 39 while standing on the ground, thereby prompting the operator not to grip the pulling handle portion 39 but to grip the riding handle 31. Besides, the pulling handle portion 39, satisfying the second condition, can give a difference between the orientation of the hand of an operator gripping the pulling handle portion 39 and the orientation of the hand of an operator gripping the riding handle 31, to thereby restrain the operator from confusion between the pulling handle portion 39 and the riding handle 31. In particular, the vertically extending shape of the gripped portion of the riding handle 31 facilitates the operator to get in and out of the cabin while gripping the riding handle 31; the laterally extending gripped portion of the pulling handle portion 39 facilitates the operator to grip the pulling handle portion 39 and pull the door 29 in a closing direction from the inside of the cabin.

Besides, the door frame 32 is formed into a shape having a gripped portion of the pulling handle portion 39 to be gripped by the hand (in this embodiment, the laterally extending portion 38), which portion keeps the clearance C3 allowing fingers of an operator to be inserted into a space between the gripped portion and the door glass 33, and a portion which keeps the clearance C4 smaller than the clearance C3 between the portion and the door glass 33 (in this embodiment, the upper and lower vertically extending portions 40 and 42); this enables the door frame 32 to be used as a handle to be pulled, with no use of other special members to be gripped and with no increase in the number of parts constituting the door frame 32, thus contributing to the simplified structure of the door frame 32, reduced cost, and improved appearance.

The invention is not limited to the foregoing embodiment but may include the following arrangements, for instance.

(1) Although it is preferable that the pulling handle portion 39 satisfies both of the first and second condition, it may satisfy only either one of the first and second conditions. For instance, the invention also includes: an embodiment where a second extending direction in which the gripped portion of the pulling handle portion 39, that is, a second gripped portion according to the invention, extends is the same as a first extending direction in which the gripped portion of the riding handle 31, that is, a first gripped portion according to the invention, extends while the height position of the gripped portion of the pulling handle portion 39 is offset upward from the height position of the upper end of the riding handle 31; and an embodiment where the height position of the gripped portion of the pulling handle portion 39 is lower than the height position of the upper end of the riding handle 31, while a second extending direction in which the gripped portion of the pulling handle portion 39 extends is different from a first extending direction in which the gripped portion of the riding handle 31 extends.

(2) The pulling handle portion 39 may lack the upper projection 39a. For instance, it is also possible that: the laterally extending portion 38 raises from the door glass 33 normal thereto to constitute a gripped portion of the pulling handle portion 39; alternatively, that both of the upper and downward extending portions 39a and 39b project from the door glass 33 normal thereto and the laterally extending portion 38 interconnects respective ends of the upper and downward extending portions 39a and 39b. In either case, the difference between the laterally extending portion 38 as the gripped portion of the pulling handle portion 39 and the gripped portion of the rear riding handle 31 is so clear that the original object of the invention of preventing the pulling handle portion from being misused as a riding handle can be achieved.

(3) The door frame 32 is not limited to one formed of a pipe member. Other member extending in one direction such as a rod member or a plate member also can be bent so as to form the door frame 32.

(4) The invention is not limited to a door having a front end to be pivotally supported by a cabin frame. For instance, the invention also targets a door having a rear end to be pivotally supported by a cabin frame and a front end movable in an opening/closing direction of the door. Also in this case, the riding handles 30 and 31 can be provided so as to be exposed outward in a door fully opened state.

(5) The invention can be applied not only to a hydraulic shovel but to another type of construction machine having a cabin with a door.

As described above, the invention can provide a door which is used for a cabin in a construction machine and includes a pulling handle portion to be pulled in a closing direction of the door from the inside of the cabin, while being capable of preventing the pulling handle portion from being misused as a riding handle. The door according to the invention is provided in a cabin including a cabin frame having an entrance and a riding handle projecting, in a specific direction, from a fringe portion fringing the entrance of the cabin frame, the riding handle including a first gripped portion extending in a first extending direction to be gripped by an operator when the operator rides in the cabin. The door comprises a door frame vertically extending and a door glass to be attached to the door frame. The door frame is attached to the cabin frame pivotally around a vertical pivot axis to allow the door to open and close the entrance of the cabin. The door frame has a pulling handle portion projecting in a direction having a component of a direction away from the door glass to be gripped for operating the door in a closing direction from the inside of the cabin. The pulling handle portion is disposed so as to be aligned with the riding handle in front and rear directions outside the cabin when the door is fully opened. The pulling handle portion has a second gripped portion to be gripped by the hand of the operator. Furthermore, the pulling handle portion satisfies at least one of the following directions: a first condition that the height position of the second gripped portion is offset upward from the height position of the riding handle; and a second condition that the second gripped portion of the pulling handle portion extends in a second extending direction different from the first extending direction.

The pulling handle portion, when satisfying the first condition, can clarify the difference in function between the pulling handle portion and the riding handle, and further make an operator fall into a difficulty in gripping the pulling handle portion while standing on the ground, thereby prompting the operator not to grip the pulling handle portion but to grip the riding handle. The pulling handle portion, when satisfying the second condition, can make the orientation of the hand of an operator gripping the pulling handle portion different from the orientation of the hand gripping the riding handle to thereby restrain the operator from confusion between the pulling handle portion and the riding handle.

In particular, the vertically extending shape of the first gripped portion of the riding handle and the laterally extending shape of the second gripped portion of the pulling handle portion clarify the difference between these two gripped portions and further facilitate an operator to get in and out of the cabin while gripping the riding handle and to pull the door in a closing direction of the door from the inside of the cabin by gripping the pulling handle portion.

Furthermore, satisfying both of the first condition and the second condition produces a synergetic effect to elevate the misuse prevention effect.

The door frame may be formed, for example, by bending a member extending in one direction, into a shape having a first portion that forms a first clearance large enough to allow fingers of an operator to be inserted into a space between the first portion and the door glass to grip the first portion and a second portion that forms a second clearance smaller than the first clearance between the second portion and the door glass. This enables the door frame to be used as a handle to be pulled, with no use of an additional member for a handle portion, and with no increase in the number of parts constituting the door frame. This results in a simplified structure of the door frame, reduced cost, and improved appearance.

It is preferable that the riding handle vertically extends while the pulling handle portion includes a laterally extending portion which extends laterally keeping the first clearance between the laterally extending portion and the door glass, the laterally extending portion constituting the second gripped portion. The laterally extending portion can satisfy the second condition. Furthermore, the laterally extending portion simultaneously can also satisfy the first condition if positioned at an upper side of an upper end of the riding handle.

More specifically, the door frame preferably has a shape of having: the pulling handle portion; an upper supported portion and a lower supported portion each extending along the pivot axis and supported to an upper portion and a lower portion of an fringe portion of an entrance of the cabin frame respectively via hinges pivotally around the pivot axis; and a joint portion, wherein the pulling handle portion is connected to the upper supported portion, and the joint portion interjoins the pulling handle portion and the lower supported portion. This shape enables the door to satisfy the second condition while the door frame is stably supported by the cabin frame at upper and lower positions thereof.

In this case, it is more preferable that the pulling handle portion has: the laterally extending portion; a first projecting portion extending from a lower end of the upper supported portion in a direction away from the door glass and projecting from the door glass in such a manner as to be connected to one end of the laterally extending portion; and a second projecting portion extending from the other end of the laterally extending portion in a direction toward the door glass and projecting from the door glass in such a manner as to extend to an upper end of the joint portion. This pulling handle portion can possess a shape of projecting from the door glass between the upper supported portion and the joint portion while being able to be desirably gripped.

This application is based on Japanese Patent Application No. 2010-150967 filed on Jul. 1, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A cabin provided in a construction machine, comprising:
a cabin frame having an entrance;
a riding handle provided on the cabin frame, the riding handle projecting from an fringe portion of the entrance in a specific direction; and
a door for opening and closing the entrance, the door comprising:
a door frame vertically extending; and
a door glass attached to the door frame, wherein:
the door frame has a pulling handle portion to be attached to the cabin frame pivotally around a vertical pivot axis so as to allow the door to open and close the entrance of the cabin, the pulling handle portion projecting in a direction having a component of a direction away from the door glass to be gripped by an operator for operating the door in a closing direction from the inside of the cabin;
the pulling handle portion is provided so as to be aligned with the riding handle in front and rear directions outside the cabin when the door is fully opened;
the pulling handle portion has a second gripped portion to be gripped by the hand of the operator; and
the pulling handle portion satisfies at least one of a first condition that a height position of the second gripped portion is offset upward from a height position of the riding handle and a second condition that the second gripped portion of the pulling handle portion extends in a second extending direction different from the first extending portion,
wherein the second gripped portion of the pulling handle portion of the door satisfies at least one of the first condition and the second condition in terms of a relationship with the riding handle.

2. The cabin provided in a construction machine according to claim 1, wherein
the riding handle extends vertically, and
the pulling handle portion includes a laterally extending portion extending laterally while keeping the first clearance being defined in between the door glass, the laterally extending portion constituting the second gripped portion.

3. The cabin for a construction machine according to claim 2, wherein
the laterally extending portion is positioned on an upper side of an upper end of the riding handle.

* * * * *